US010783683B2

(12) United States Patent
Pettersson

(10) Patent No.: US 10,783,683 B2
(45) Date of Patent: *Sep. 22, 2020

(54) IMAGE STITCHING

(71) Applicant: Microsoft Technology Licensing, LLC, Redmond, WA (US)

(72) Inventor: Gustaf Pettersson, Ljungbyhed (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

This patent is subject to a terminal disclaimer.

(21) Appl. No.: 15/914,992

(22) Filed: Mar. 7, 2018

(65) Prior Publication Data

US 2018/0197321 A1 Jul. 12, 2018

Related U.S. Application Data

(63) Continuation of application No. 15/090,532, filed on Apr. 4, 2016, now Pat. No. 9,947,121.

(51) Int. Cl.
| | |
|---|---|
| *G06T 11/60* | (2006.01) |
| *G06K 9/46* | (2006.01) |
| *G06T 3/00* | (2006.01) |
| *G06K 9/62* | (2006.01) |
| *G06T 7/32* | (2017.01) |

(52) U.S. Cl.
CPC ............. *G06T 11/60* (2013.01); *G06K 9/4609* (2013.01); *G06K 9/6215* (2013.01); *G06T 3/0093* (2013.01); *G06K 2009/4666* (2013.01); *G06T 7/32* (2017.01); *G06T 2207/20221* (2013.01); *G06T 2210/44* (2013.01)

(58) Field of Classification Search
CPC ......... G06K 2009/4666; G06K 9/4609; G06K 9/6215; G06T 11/60; G06T 2207/20221; G06T 2210/44; G06T 3/0093; G06T 7/32
See application file for complete search history.

(56) References Cited

U.S. PATENT DOCUMENTS

| | | | | |
|---|---|---|---|---|
| 2009/0148051 A1* | 6/2009 | Pham | ....................... | G06K 9/32 382/219 |
| 2010/0054628 A1* | 3/2010 | Levy | ..................... | G06T 3/4038 382/284 |

* cited by examiner

*Primary Examiner* — Manuchehr Rahmjoo

(57) ABSTRACT

A computing device is described which has a memory holding at least two input images depicting different parts of a panoramic scene, the images having been captured by a user moving the camera by hand to capture the panorama. The computing device has an image stitching component configured to identify, at a processor, a region of overlap between the at least two images and to calculate a displacement vector for each of a plurality of warp points in the region of overlap. The image stitching component is arranged to warp a second one of the at least two images using the warp points; and to join the warped second image to the first image.

20 Claims, 9 Drawing Sheets

US 10,783,683 B2

IMAGE STITCHING

CROSS REFERENCE TO RELATED APPLICATIONS

This application is a continuation of and claims priority to U.S. application Ser. No. 15/090,532, entitled "IMAGE STITCHING," filed Apr. 4, 2016, which is incorporated herein in its entirety.

BACKGROUND

Cameras available on camera phones, tablet computers, or other mobile computing devices are of increasingly high quality. Dedicated digital cameras are also increasingly widely available in hand-held, portable form. However, digital cameras, as with other types of camera, generally have a fairly limited field of view so that it is difficult to capture panoramic scenes. One approach is to capture multiple photographs with overlapping fields of view by moving the camera to a new location for each photograph. The multiple digital photographs are then stitched together to form a panoramic image.

The embodiments described below are not limited to implementations which solve any or all of the disadvantages of known image stitching apparatus.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device is described which has a memory holding at least two input images depicting different parts of a panoramic scene, the images having been captured by a user moving the camera by hand to capture the panorama. The computing device has an image stitching component configured to identify, at a processor, a region of overlap between the at least two images and to calculate a displacement vector for each of a plurality of warp points in the region of overlap. The image stitching component is arranged to warp a second one of the at least two images using the warp points; and to join the warped second image to the first image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
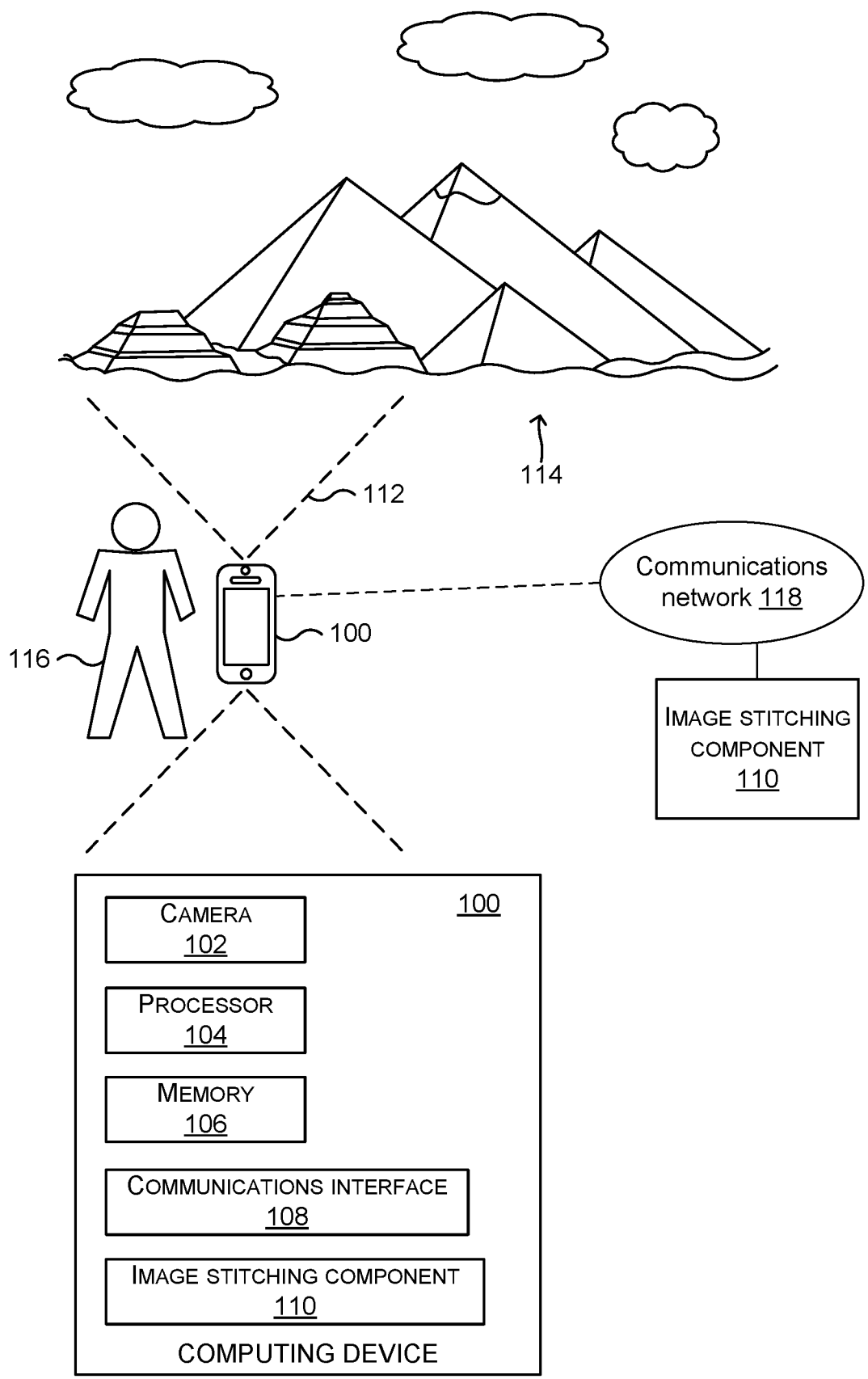
FIG. 1 is a schematic diagram of a mobile computing device with a camera used to capture a photograph of a panorama of pyramids in the desert.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, cameras generally have a limited field of view so that it is difficult to capture panoramic scenes. One approach is to capture multiple photographs with overlapping fields of view by moving the camera for each photograph. For example, by rotating the camera or by pointing the camera in a slightly different direction. The resulting multiple digital photographs are then projected/aligned and stitched together to form a panoramic image. However, due to parallax which occurs as a result of motion of the camera, and/or motion of objects in the scene, the resulting stitched image is often inaccurate and contains artifacts such as lines or other features which do not depict real surfaces in the scene. The term "overlapping" is used to mean that one field of view covers at least part of another field of view. In the case of sweep panorama, where a user sweeps his or her image capture device whilst images are being captured, the percentage of overlap can be as much as 95% or more. However, the examples described herein are also applicable for situations where the amount of overlap is less than 50%.

In the examples described herein a hand held, head mounted, or body worn camera is used to capture a plurality of digital images of different parts of a scene. For example, a user makes a sweeping motion with his or her camera phone and captures a series of digital images. Because the camera is not in a controlled camera rig there are unknown changes in yaw (horizontal rotation), pitch, roll and translation of the camera. In addition, minor and/or major motions of objects in the scene often occur (such as people walking, cars driving, waves moving on water, trees moving in the wind, clouds moving in the sky). As a result it is impossible in many cases to perfectly align two images by applying a single transform (projection), since different parts of the images are to be aligned differently. Finding a seam between two images, along which the difference between the images is minimized enables a panoramic image to be formed. However, on its own this approach cannot mitigate all artifacts causes by parallax as it does not give good local alignment in the case of camera motions which include changes in yaw (horizontal rotation), pitch, roll and translation, such as is typical for hand held, head mounted, and body worn cameras.

The examples described herein relate to an image stitching process which is particularly efficient (in terms of memory use and/or processing capacity) and which gives good quality results where parallax artifacts are ameliorated. The process is configured to use multi-threading where possible although this is not essential and in some embodiments the process is implemented on a central processing unit (CPU) of a camera phone, digital camera or cloud service infrastructure. A warp field is computed in a simple, efficient manner and used to warp an overlapping region of a second image. The warped second image is then stitched to a first image yielding high quality results in a fast manner. The second image is warped in a manner which enables parallax, due to motion (of the camera and/or scene), to be taken into account. The warped second image is stitched to the first image along a seam computed to give good quality results.

A warp field is approximated as a plurality of displacement vectors, one for each of a plurality of points arranged in a tessellation, where the points correspond to pixel locations of an image to be warped. Typically the warp field has fewer points than there are pixels in the image but this is not essential. A warp field is used to specify a mapping to be applied to an image whereby color values stored at pixel locations are moved according to displacement vectors specified in the field. Where the warp field, approximated as a tessellation of points (referred to herein as a warp tessellation), has fewer points than there are pixels in the image, interpolation is used to calculate displacement vectors to apply to pixels which do not lie directly under a tessellation point. How to obtain the displacement vectors in an efficient manner, which still gives good quality results, is described in more detail below. For example, it involves computing the warp field approximation for a region of overlap rather than for a complete image. For example, it involves computing the displacement vectors using comparisons between two images, for points in the warp tessellation along a line in the region of overlap, and then interpolating displacement vectors for other points in the warp tessellation. This reduces the number of memory look ups for the image comparisons and it reduces the number of calculations.

FIG. 1 is a schematic diagram of a hand held mobile computing device 100 with a camera 102 used to capture a digital image of part of a panorama 114 of pyramids in a desert with clouds in the sky. In some examples the camera is in a head worn computing device or a body worn computing device. The camera 102 has a field of view 112 which is limited so that the complete panorama 114 cannot be captured in a single image by the camera 102. The camera 102 is a digital camera, such as a digital color camera, a digital greyscale or monochrome camera, a web camera, a camera in a smart phone, a camera in a tablet computer, or any other hand held camera or hand held device incorporating a camera. The camera is a video camera in some examples, where still frames of the video are to be stitched together to form a panoramic image.

In the example of FIG. 1 the panorama comprises a scene of pyramids in the desert for illustration purposes. The computing device 100 can also be used to capture panoramas which are in a near field of the camera rather than remote of the camera as in the FIG. 1 example. A panorama is any wide-angle view of a scene, independent of the distance of the scene from the camera.

The computing device 100 incorporates an image stitching component 110 in some examples. In some examples the computing device 100 is in communication with an image stitching component 110 via a communications network 118 such as the internet, an intranet, a wireless network, a wired network or another type of communications network 118.

The computing device 100 is described in more detail with reference to FIG. 8 below and in summary the computing device comprises a camera 102, a processor 104, a memory 106, a communications interface 108 (such as to communicate with image stitching component 110 via communications network 118), and an image stitching component 110 in some cases. In some examples, the computing device 100 is itself a digital camera such as the digital camera of FIG. 9 described below. In some cases the computing device 100 is a camera phone, a tablet computer with a camera, a laptop computer with a camera, a stylus with a camera or another type of hand held computing device with a camera. In some examples the computing device 100 is a head worn computing device or a body worn computing device. Where the computing device is head worn the use is able to make the sweep motion of the camera by moving his or her head.

The image stitching component 110 is implemented using any one or more of: software, hardware, firmware. For example, in some cases the functionality of the image stitching component 110 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs). In some examples, the image stitching component uses multi-threading implemented on a parallel processing unit such as a graphics processing unit. However, this is not essential as the image stitching component is implemented on a central processing unit (CPU) in some examples.

In the case that the image stitching component 110 is located remote of the computing device 100 the computing device 100 sends a plurality of images of a scene (in compressed form in some cases, although it is not essential to use a compressed form) to the image stitching component 110 over the communications network 118. The image stitching component computes a panoramic image by stitching the plurality of images together, and returns the panoramic image to the computing device 100 via the communications network 118.

Figure 2:
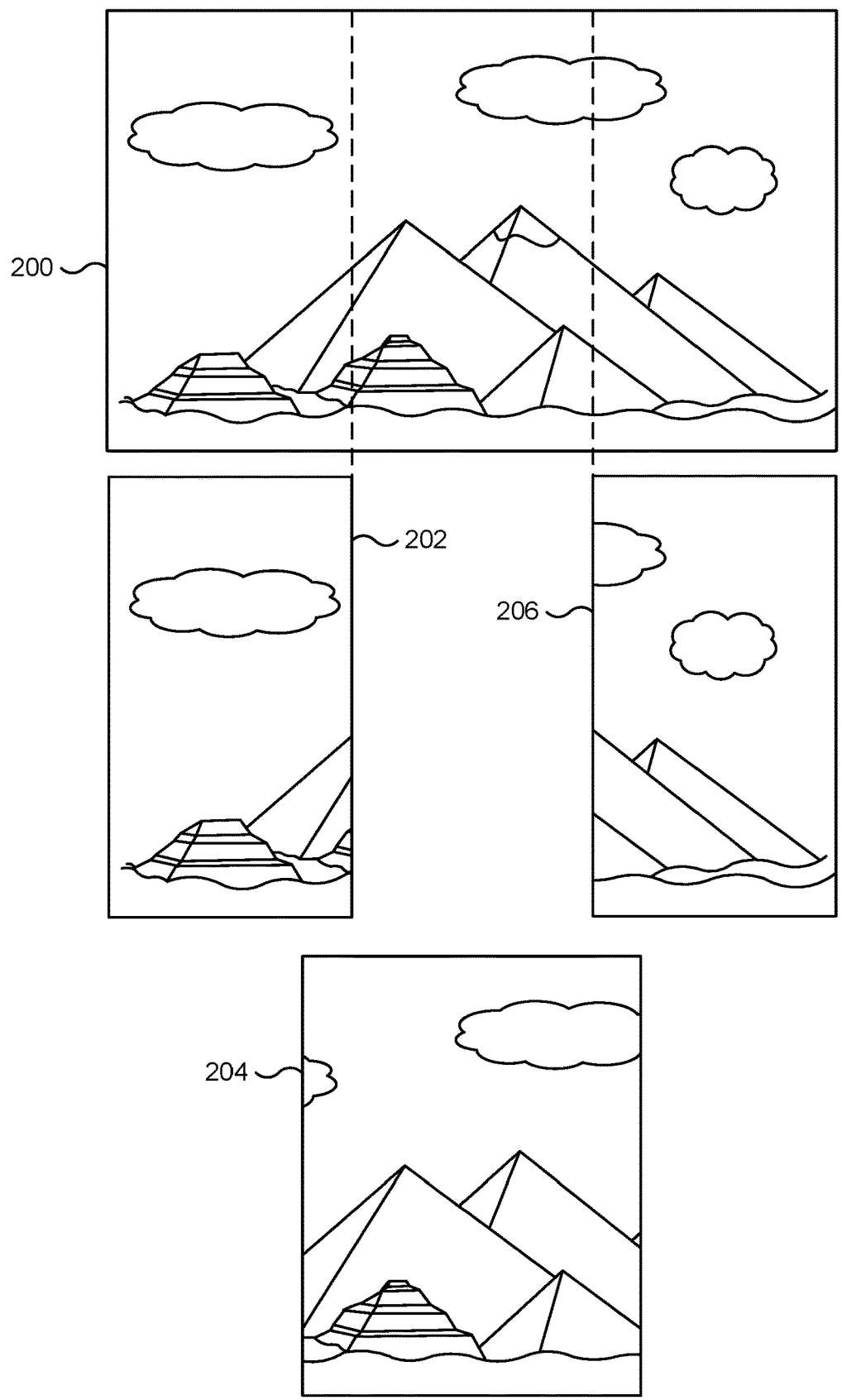
FIG. 2 is a schematic diagram of a stitched panoramic photograph of the scene of FIG. 1 and showing three digital photographs used to create the stitched panoramic photograph.

FIG. 2 shows schematically a panoramic image 200 created by the image stitching component from images captured by the computing device 100 of FIG. 1 depicting the pyramid scene. The dotted lines in image 200 are not part of the image and are included to aid understanding of how the image 200 is formed from three individual images 202, 204, 206 stitched together. In this example, the user has moved the camera by horizontal rotation to capture images 202, 204 and 206. In practice the camera motion includes one or more of horizontal rotation (changes in yaw), translation (for example, in the z direction towards or away from the pyramids), torsional rotation, changes in pitch. However, only horizontal rotation is represented approximately in FIG. 2 for ease of explanation.

The panoramic image is a composite formed from parts of the individual images 202, 204, 206 as it is seen from FIG. 2 that the individual images have an aggregate length which is longer than the panoramic image. The individual images have an aggregate width which is wider than the panoramic image in some examples.

Figure 3:
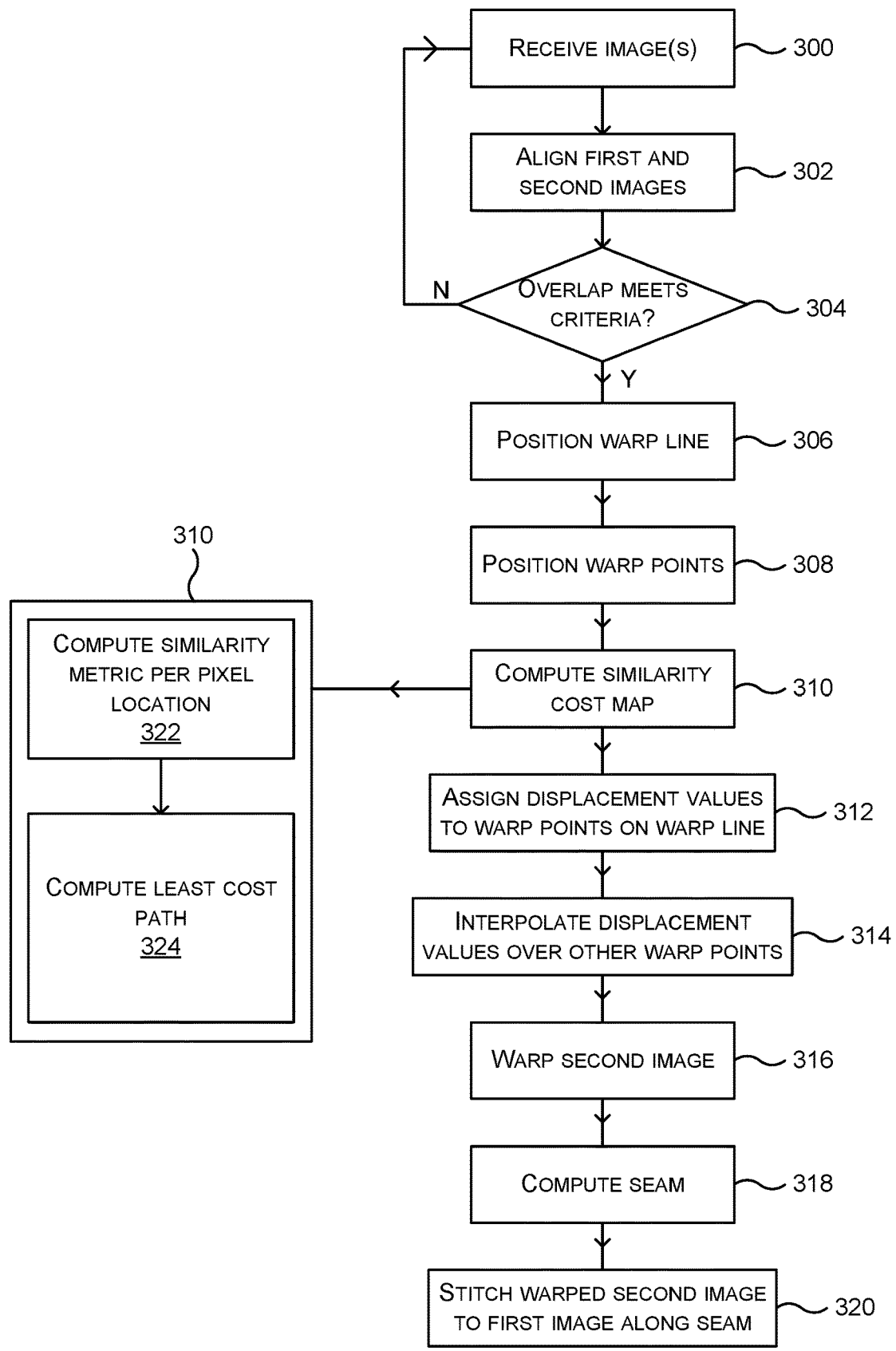
FIG. 3 is a flow diagram of a method at an image stitching component.

FIG. 3 is a flow diagram of a method of operation at an image stitching component 110 such as that of FIG. 1. The image stitching component receives 300 a first and a second image. For example, it accesses the images from memory 106 or receives the images directly from the camera 102. The first and second images have been captured in order to form a panoramic image, for example, where the user sweeps the computing device 100 in an arc type motion whilst the images are captured.

The image stitching component aligns the first and second images 302 by finding a projection of one image with respect to the other image such that there is a good correspondence between features depicted in the images. The features are lines, edges, corners, color values, texture, or other content features of an image. The alignment is computed automatically by the image stitching component, for example, by computing an optimization to search the space of possible alignments. Once the alignment has been computed, an amount of overlap between the two images for the computed alignment is found. For example, the amount of overlap is expressed as a proportion of the image size.

A check is made 304 as to whether the amount of overlap meets criteria, such as being greater than a first specified threshold and less than a second specified threshold. In an example, the amount of overlap meets criteria if it is more than 5% of the image area and less than 100% of the image area. For example, in the case of sweep-panorama, where a user makes an arc type sweeping motion of the image capture device whilst images are being captured, the amount of overlap is often 95% or more. In point-and-shoot type scenarios the amount of overlap is often around 50%. These are examples only and other values may be used. If the amount of overlap is too big then the stitching will not produce a panoramic image showing that much more of the panorama than either of the images alone. If the amount of overlap is too small then it becomes difficult to compute a high quality alignment, warp and stitching of the images together.

If the overlap fails to meet the criteria then one or both of the images are rejected and the process returns to operation 300. If the criteria are met the image stitching component proceeds to position 306 a warp line in the overlapping region. The warp line comprises a column of a warp tessellation and it is a straight line in some cases, positioned so as to divide the region of overlap approximately in half longitudinally. The image stitching component positions 308 warp points on the warp line where the warp points are points selected from the warp tessellation. The spacing between the warp points is varied according to a trade-off between computational resources and quality. The warp tessellation is a plurality of locations in the overlapping region and, at this stage, the displacement vectors associated with the locations is not yet known. The locations form a tessellation which covers all or part of the overlapping region and, in some examples, extends into areas of a second image which are outside the overlapping region as explained in more detail below.

Computing displacement vectors for the locations of the warp tessellation is resource intensive where it involves making comparisons between the two images. This is because many similarity metrics used to make the comparison required significant computation. Also, to make the comparisons, memory look ups to the two images are needed to retrieve intensity values in one or more color bands of the two images. These memory looks ups are themselves resource intensive. Therefore the image stitching unit computes the displacement vectors in this manner for some but not all of the warp tessellation locations in some examples. The choice of which warp tessellation locations to use is made using the warp line and by selecting points on the warp line.

The image stitching component computes 310 a similarity cost map which is used to obtain the displacement vectors for at least some of the points on the warp line. The similarity cost map is an array of values where individual rows represent individual points on the warp line and individual columns represent displacement vectors (where the displacement vectors are constrained). A least similarity cost path through the similarity cost map is calculated in any suitable manner, such as by using dynamic programming. The values of the displacement vectors are constrained so that the problem of finding the displacement vectors is reduced to a one dimensional problem. This is achieved in various different ways. For example, by constraining the displacement vectors to be in a single direction parallel to the warp line. In another example, the displacement vectors are constrained to be parallel to gradients in a patch surrounding the associated warp point. Constraining the displacement vectors improves efficiency, and yet is found to give good quality results in practice.

Figure 5:
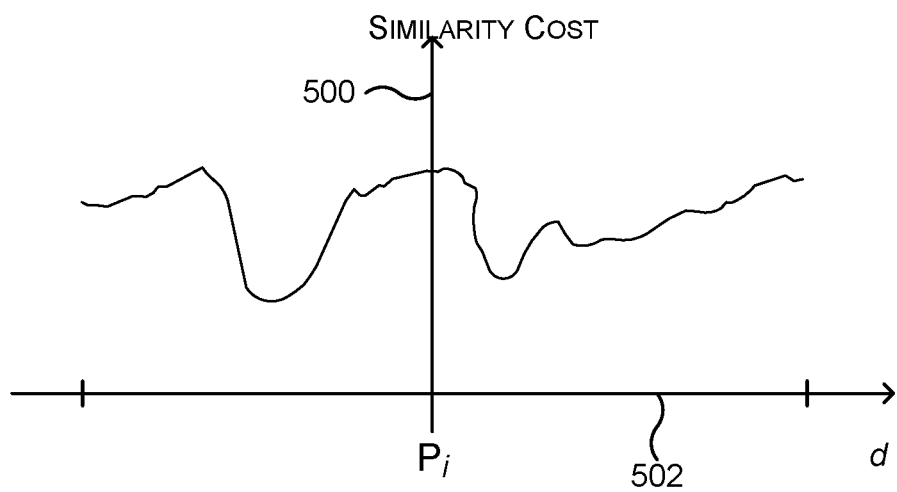
FIG. 5 is a graph of similarity cost against displacement.

A similarity metric is computed 322 to measure degree of similarity of local neighborhoods around image points in the two images. Any similarity metric is used such as the sum of absolute pixel-wise intensity differences in a neighborhood around a pixel location (for a given color band), or the average pixel-wise intensity difference, or the sum of squared pixel-wise intensity differences or other similarity metric. For a given warp point the similarity metric is calculated for a plurality (such as a range) of different possible displacements in the direction of the warp line. For example, by calculating intensity differences between pixels around the warp tessellation location and around a location displaced by a specified amount from the warp tessellation location. The results are plotted in a graph such as that of FIG. 5 for a single warp tessellation location $p_i$. A low similarity cost in the graph of FIG. 5 represents a high degree of local similarity between the neighborhood around the warp point location in the first image and the neighborhood around the displaced position in the second image. The process is repeated for each warp tessellation location to fill the values in the similarity cost map. By using possible displacements in the direction of the warp line (such as vertically up or vertically down) the problem of finding displacement vectors is reduced to a one dimensional problem and this improves efficiency of the process. It is found that in practice, reducing the problem to a one-dimensional problem in this way still enables high quality results to be obtained.

Computing the similarity cost map is relatively resource intensive and the processes is parallelized in some cases by using one thread per warp grid location and executing the threads in parallel. This is possible since the computation of the displacement vectors for one warp tessellation location is independent of other warp tessellation locations.

The similarity cost map comprises a large number of possible displacement vectors for each warp point (on the warp line). To select one of these displacement vectors it is possible to pick the displacement vector with the lowest similarity cost (highest local similarity between the two images). However, due to noise, exposure differences, movement in the scene, movement of the camera, this is found to introduce severe artifacts. It has been found that by constraining the difference in displacement between adjacent warp points, it is possible to reduce artifacts and achieve good quality results.

Figure 6:
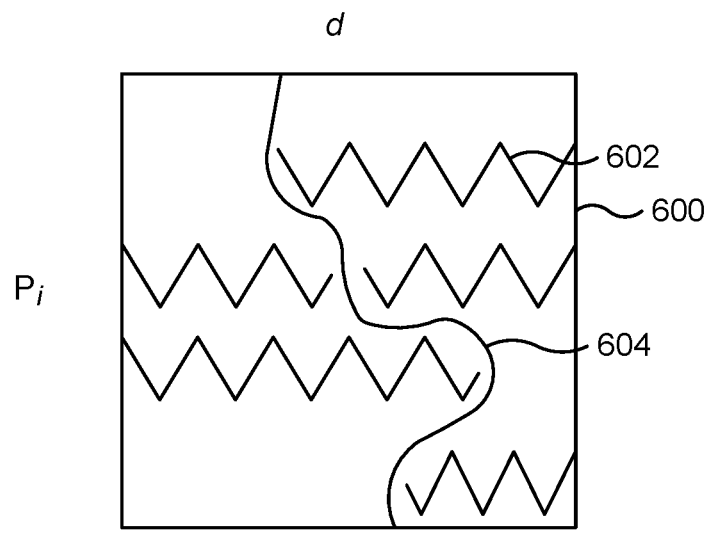
FIG. 6 is a schematic diagram of a similarity cost map.

Constraining the difference in displacement between adjacent warp points so that the difference in displacement is smooth and gradual rather than discontinuous and/or having abrupt changes, is achieved by finding a least similarity cost path through the similarity cost map. FIG. 6 shows a similarity cost map in schematic form with the symbol d denoting the displacement vectors (in the direction of the warp line) of the columns and the symbol $P_i$ denoting the warp tessellation points of the rows. An entry in a cell of the similarity cost map is the value of the similarity metric calculated for the displacement vector and warp tessellation point specified by the column and row of the cell. In the schematic similarity cost map of FIG. 6 regions where the values in the cells indicate poor similarity are marked with zig-zag lines 602. A least similarity cost path through the similarity cost map is depicted as line 604.

In order to calculate a least similarity cost path through the similarity cost map, dynamic programming is used in some examples 324. However, this is not essential as other methods of optimization are used in some cases. Dynamic programming comprises breaking down an optimization problem into sub-problems, solving each of the sub-problems once and storing their solutions (in a matrix M in the example below). During search for an optimal solution, the next time the same sub-problem occurs, the search process looks up the previously computed solution.

An example in which dynamic programming is used to find the least similarity cost path through the similarity cost map is now given. In this example, the tessellation of warp points is a grid. In this example dynamic programming with a top-down approach is used whereby the problem is first broken down into sub-problems and then the process calculates and stores values. The dynamic programming process comprises two consecutive steps. First, the cumulative (also referred to as accumulated) similarity costs C(Pi; d) are computed for every pair (Pi; d) and stored in a matrix M which has the same dimensions as the similarity cost map. The accumulated similarity cost is calculated using the following equation:

$$C(P_i,d) = \text{cost}(P_i,d) + \min(C(P_i-1,d-n), C(P_i-1,d-n+1), \ldots, C(P_i-1,d+n))$$

which may be expressed in words as the accumulated similarity cost for warp point $P_i$ and displacement vector d is equal to the similarity cost from the similarity cost map for the warp point $P_i$ and displacement vector d, plus the minimum of the similarity costs, from the row immediately above the row $P_i$ in the similarity cost map, for any of the locations in the range d−n to d+n, where n is a user configurable parameter having an integer value which specifies an upper limit on the magnitude of the change in displacement between adjacent rows of the second image. In an example, n=1 although other values of n may be used.

In the second step, the best path is reconstructed by tracing back the best moves stored in M starting from the bottom row until the origin top row of M is reached. Once the best path is computed, the displacement vectors along the least similarity cost path are looked up and assigned 312 to the respective warp grid points.

In some examples, content of the second image is examined to check for the presence of transitions between foreground and background. Locations of such transitions are optionally taken into account when computing the least similarity cost path using dynamic programming. This is explained in more detail below with reference to FIG. 7.

In practice, it is found that using dynamic programming to compute the least similarity cost path through the similarity cost map gives good working results in many situations and at the same time, is efficient to compute. In particular, use of the dynamic programming enables the image stitching component to constrain the difference in displacement between adjacent warp points, and so reduce artifacts and achieve good quality results. By using dynamic programming it is possible to optimize the warp points simultaneously to minimize the similarity cost function and this enables high quality results to be achieved.

At this point in the process (end of operation 312) the warp points which are on the warp line have displacement vectors assigned to them. Other warp points in the warp tessellation do not yet have displacement vectors. To calculate appropriate displacement vectors for the remaining warp points, these are interpolated 314 from the displacement vectors of the warp points on the warp line. Linear interpolation is found to give good results. Other more complex interpolation methods are used in some examples according to a trade-off between computational similarity cost and quality of results. More detail about an example linear interpolation process is now given with reference to FIG. 4.

Figure 4:
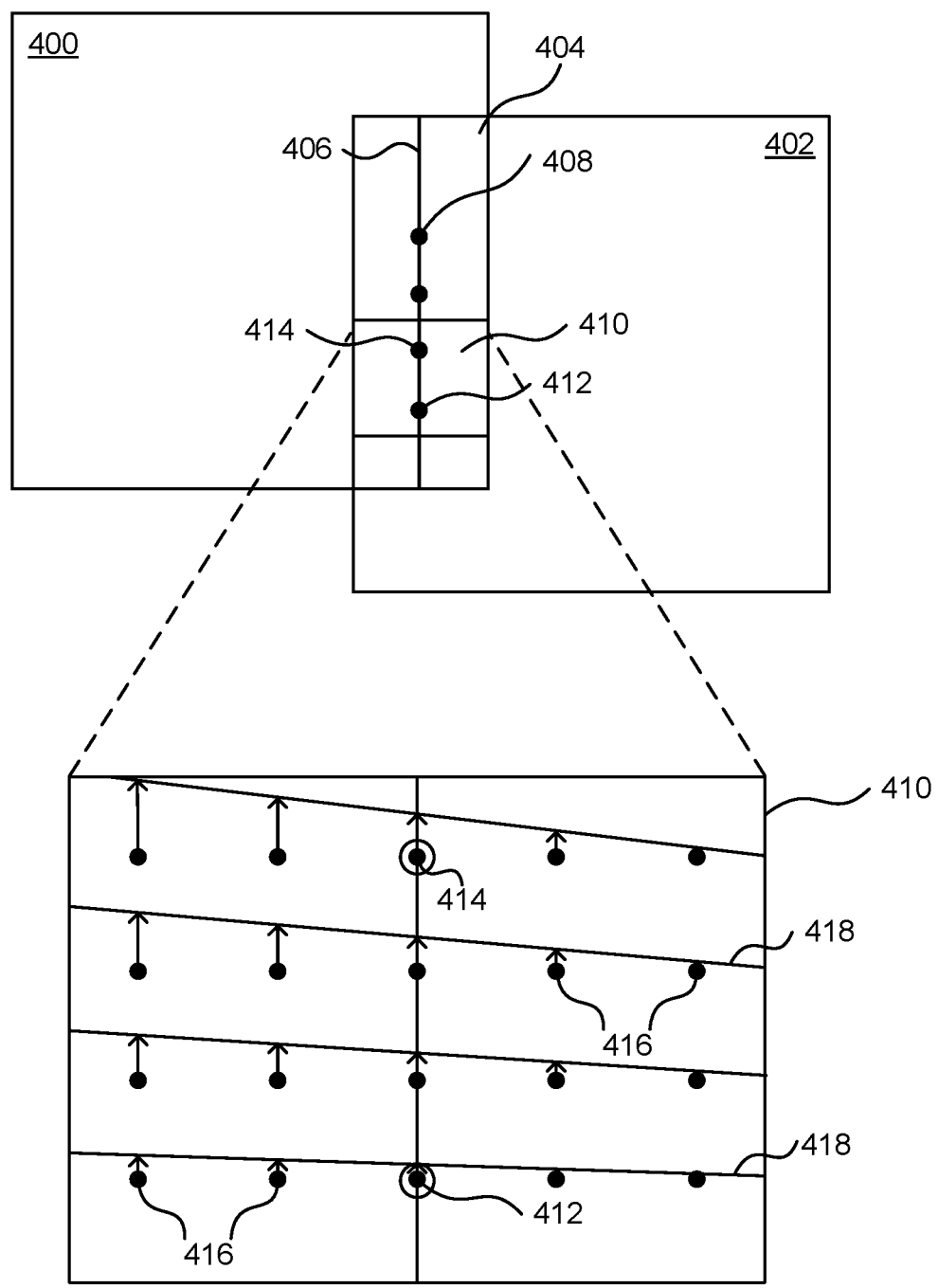
FIG. 4 is a schematic diagram of two overlapping digital images and with an enlargement of part of an overlapping region showing a warp grid.

FIG. 4 shows a first image 400 and a second image 402 which have been aligned according to operation 302 to give a region of overlap 404. A warp line 406 is positioned in the overlapping region and has four warp points on it 408, 414, 412. In practice there are many more warp points although for clarity only four are shown. In the example of FIG. 4 the warp tessellation is in the form of a grid for simplicity of explanation. However, it is not essential to use a grid, as any other type of tessellation is possible using triangles, hexagons or other tessellating shapes and where points of the tessellation are at vertices of the tessellating shapes and/or at centers of the tessellating shapes.

In the example of FIG. 4 a warp grid is positioned over the overlapping region and part of the warp grid is shown in box 410 in magnified form. The warp line has two of the warp points 412 and 414 visible in the magnified region. Additional other warp points are present in the warp grid such as points 416. The warp line is used simply as a way to select points of the tessellation for which displacement vectors are calculated directly by comparing the first and second images, rather than by interpolation. The warp line is straight in some examples and in other examples it is curved. The warp line is any substantially continuous path.

The displacement vectors for warp points 414 and 412 are known from least similarity cost path of the similarity cost map and are indicated as arrows from points 414 and 412 where the length of the arrow indicates the magnitude of the displacement and the direction of the arrow indicates the direction of the displacement (which is constrained to be vertically up or vertically down in this example). A zero valued displacement is assigned to pixel locations on the edge of the overlapping region corresponding to the edge of the first image 400. Using the zero value displacement location and the displacement vector of grid point 412 a line is interpolated 418 and used to infer displacement vectors of the other warp grid point associated with the line. This is one example of how interpolation is achieved although others are possible. Multi-threading is used to parallelize computation of the interpolation in some examples, by using one thread per row of the grid (or other tessellation) and using a parallel computing unit such as a graphics processing unit.

After the interpolation operation 314 the warp tessellation points have displacement vectors associated with them. The warp tessellation, populated with the displacement vectors, is used to warp 316 the overlapping region of the second image. This is done by moving intensity values from pixel locations in the overlapping region of the second image according to the displacement vectors specified in the warp tessellation overlying the overlapping region. In this way parallax is corrected for without introducing artifacts since the warp tessellation has been calculated in a manner which takes into account the least similarity cost path in the similarity cost map. By warping only a part of the second image (the overlapping region), to make it align locally to the first image it is being stitched into, it is found that efficiencies are gained whilst still achieving good quality results. In some examples multi-threading is used to implement the warping process. For example, using one thread per row of the warp tessellation and using a parallel computing unit such as a graphics processing unit.

In some examples, the warp tessellation extends beyond the overlapping region into the second image. In this case the second image is warped beyond the overlapping region as well as in the overlapping region.

A seam is computed 318 between the first image and the warped second image. The seam is a boundary between the first and second images which is an irregular line computed to give an optimal join. In an example, the seam is computed by using a second similarity cost map where the similarity metric is an absolute difference in intensity values between the first and second images in a given color space. The second similarity cost map is a 2D array corresponding to the overlapping region. A lowest similarity cost path is computed through the second similarity cost map to find a route where the color difference is lowest. This route is taken as the seam and used to stitch 320 the two images together. The stitching is implemented using multi-threading in some cases by using one thread per row of pixels and using a parallel computing unit such as a graphics processing unit.

In some examples, the problem of computing the displacement vectors for the warp points on the warp line is formulated as a Markov random field (MRF) optimization rather than as a dynamic programming problem. Formulating the problem as an MRF optimization problem allows information about color in the images to be used. This is more computationally expensive than using dynamic programming and is found to give good results, such as by giving areas of similar color the same displacement. In this method no explicit constraint is inferred on the displacement vectors.

A Markov random field is a set of random variables described by an undirected graph and where the random variables have a memory-less property (depending only upon the present state and not the sequence of events that preceded it) of a stochastic process. Edges of the undirected graph are assigned values according to color similarity between neighboring pixels in the panoramic image (the image being created). The warp points on the warp line are represented as vertices of the graph. A data penalty function of the Markov random field is a function of the displacement similarity cost (as described above with reference to FIG. 5) and displacements for each point are random variables of the Markov random field to be optimized.

Figure 7:
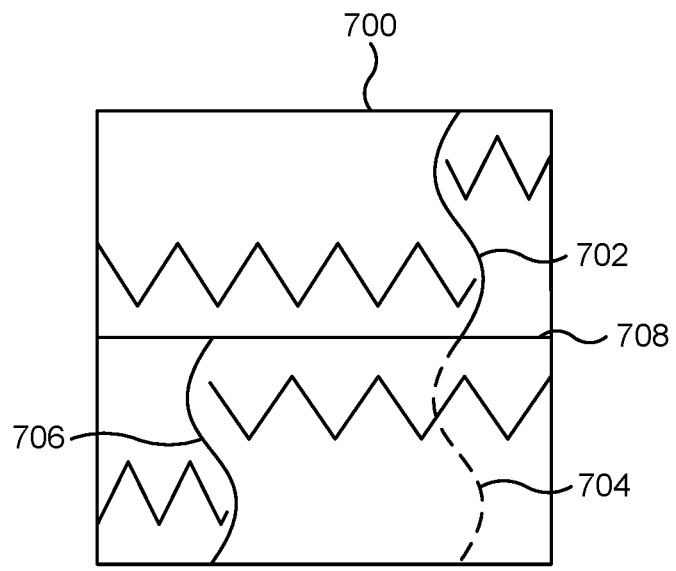
FIG. 7 is a schematic diagram of another similarity cost map.

FIG. 7 shows a schematic diagram of a similarity cost map in the case that a transition between foreground and background is present along line 708. For example, where a foreground object is closer to the camera than the background. In this situation a method that constrains the difference between adjacent warp points, such as the dynamic programming method described above, when used to compute a lowest similarity cost path in the similarity cost map, computes route 702 to 704. That is, it computes a path which passes through a high similarity cost region (where the dotted line 704 passes through zig-zags). Using the MRF formulation the path 706 is calculated. In the case of a method that constrains the difference between adjacent warp points, the process of computing the least similarity cost path using dynamic programming is modified to take into account transitions between foreground and background in the second image. For example, this is done by adding an interaction potential term in the accumulated similarity cost function described above.

Figure 8:
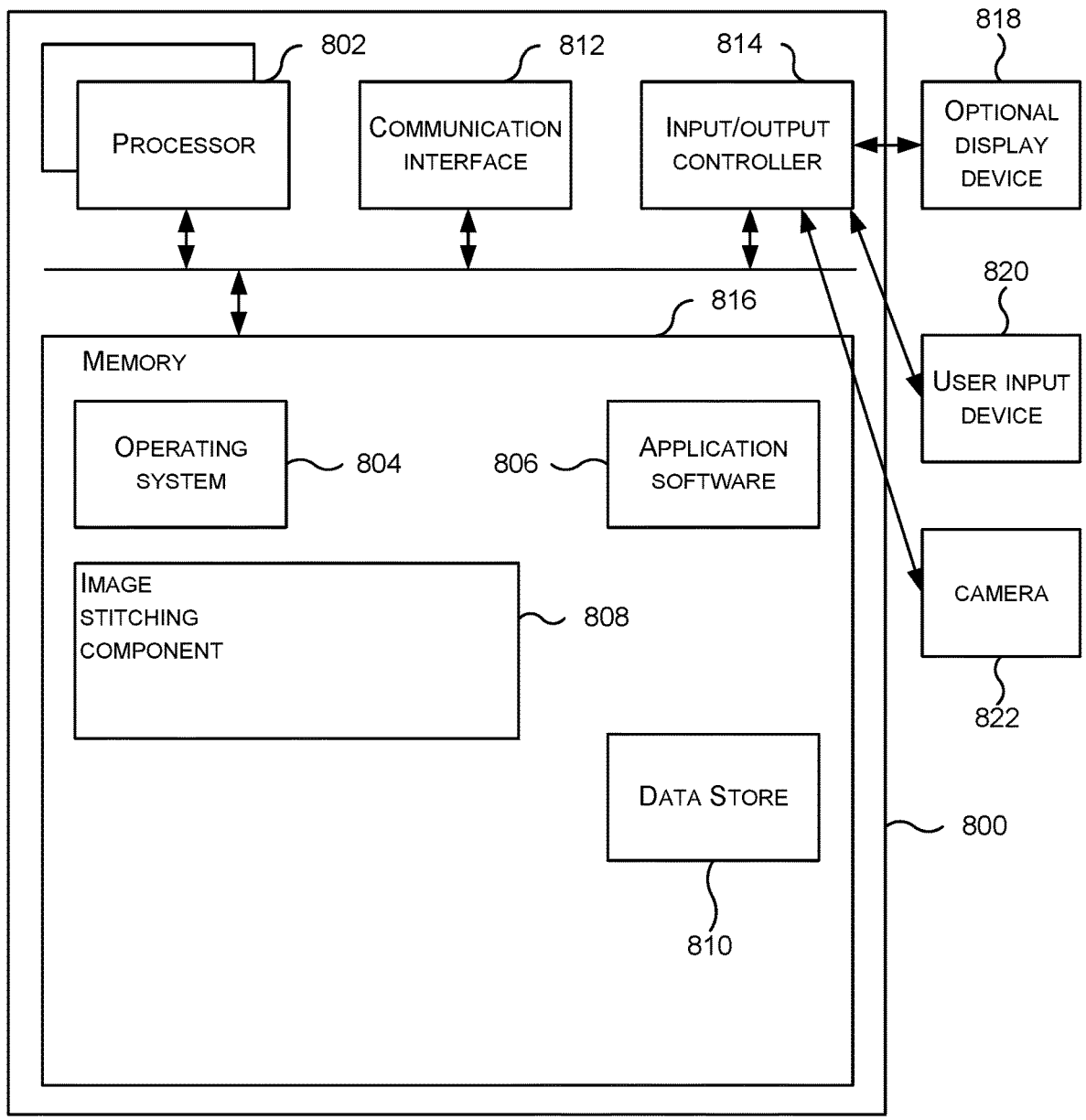
FIG. 8 is a schematic diagram of a computing-based device in which embodiments of an image stitching component are implemented.

FIG. 8 illustrates various components of an exemplary computing-based device 800 which are implemented as any form of a computing and/or electronic device, and in which embodiments of an image stitching component are implemented in some examples.

Computing-based device 800 comprises one or more processors 802 which are microprocessors, controllers or any other suitable type of processors for processing computer executable instructions to control the operation of the device in order to stitch two or more images together to form a panoramic image. In some examples the processors 802 include a parallel-processing unit such as a graphic processing unit. In some examples, for example where a system on a chip architecture is used, the processors 802 include one or more fixed function blocks (also referred to as accelerators) which implement a part of the method of FIG. 3 in hardware (rather than software or firmware). Platform software comprising an operating system 804 or any other suitable platform software is provided at the computing-based device to enable application software 806 to be executed on the device. A data store 810 holds images, similarity cost maps, warp grids or other data. An image stitching component 808 is stored in memory 816 as computer executable instructions in some examples.

The computer executable instructions are provided using any computer-readable media that is accessible by computing based device 800. Computer-readable media includes, for example, computer storage media such as memory 816 and communications media. Computer storage media, such as memory 816, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 816) is shown within the computing-based device 800 it will be appreciated that the storage is, in some examples, distributed or located remotely and accessed via a network or other communication link (e.g. using communication interface 812).

The computing-based device 800 also comprises an input/output controller 814 arranged to output display information to a display device 818 (such as a display to show the panoramic images) which may be separate from or integral to the computing-based device 800. The display information may provide a graphical user interface. The input/output controller 814 is also arranged to receive and process input from one or more devices, such as a user input device 820 (e.g. a mouse, keyboard, camera, microphone or other sensor). In some examples the user input device 820 detects voice input, user gestures or other user actions and provides a natural user interface (NUI). This user input may be used to capture digital photographs, select images to be stitched together, view panoramic images generated by the image stitching component, or for other purposes. In an embodiment the display device 818 also acts as the user input device 820 if it is a touch sensitive display device. The input/output controller 814 outputs data to devices other than the display device in some examples, e.g. a locally connected printing device.

Any of the input/output controller 814, display device 818 and the user input device 820 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Figure 9:
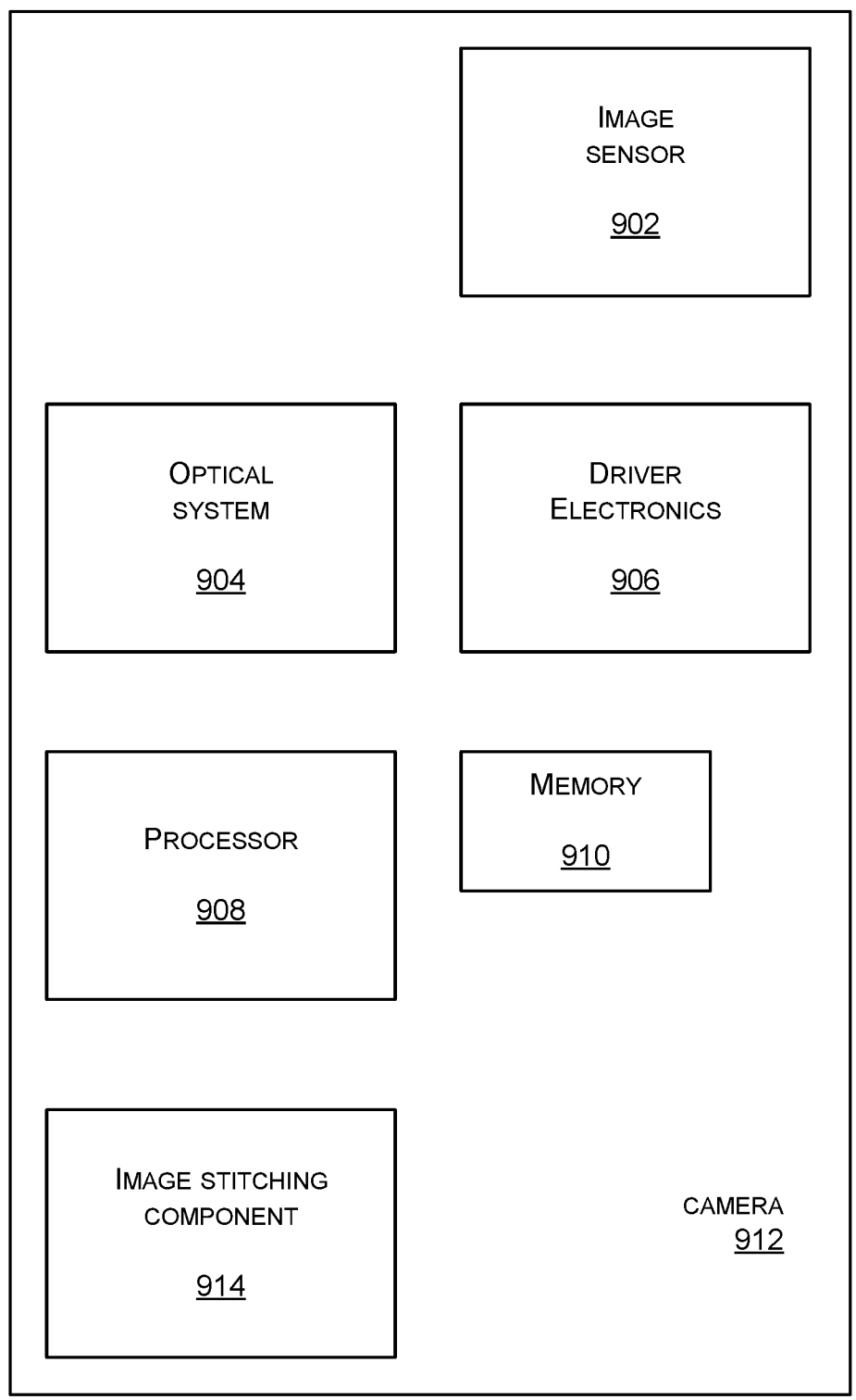
FIG. 9 is a schematic diagram of a camera with an image stitching component.

In some examples the image stitching component 914 is integral with a digital camera 912 as now described with reference to FIG. 9.

A digital camera 912 comprises an image sensor 902 that receives light reflected from objects within the scene. The image sensor 204 comprises a charge-coupled device (CCD) sensor, a complementary metal-oxide-semiconductor (CMOS) sensor, for example a Photonic Mixer Device (PMD) sensor or other appropriate sensor which is arranged to detect light reflected and emitted from objects, people and surfaces within the camera range.

The camera comprises an optical system 904 that is arranged to gather and focus reflected light from the environment on to the image sensor 902. The camera comprises driver electronics 906 which control the image sensor 902 and the optical system 904. An image sensor may be shuttered on and off electronically rather than with physical shutters.

In one example the camera comprises a processor 908 and a memory 910 which stores sensor data from the image sensor 902. Where, an image stitching component 914 is at the camera it comprises software stored at memory 910 and executed at processor 908 in some cases. In some examples the image stitching component 914 is a field programmable gate array (FPGA) or a dedicated chip. For example, the functionality of the image stitching component 914 is implemented, in whole or in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

A computing device comprising:

a memory holding at least two input images depicting different parts of a panoramic scene, the images having been captured by a user moving the camera to capture the panorama; and an image stitching component configured to identify, at a processor, a region of overlap between the at least two images;

the image stitching component arranged to calculate a displacement vector for each of a plurality of warp points in the region of overlap;

the image stitching component arranged to warp a second one of the at least two images using the warp points, and to join the warped second image to the first image.

A computing device as described in the paragraph immediately above where the image stitching component is arranged to warp the second image only in the region of overlap.

A computing device as described above where the image stitching component is arranged to calculate individual ones of the displacement vectors in a single direction.

The computing device described above where the single dimension is a direction parallel to an intensity gradient in a neighborhood around a warp point.

A computing device as described above where the image stitching component is arranged to calculate the displacement vectors by constraining a difference in displacement vectors between adjacent ones of the warp points.

The computing device described in the paragraph immediately above where the image stitching component is arranged to constrain the difference in displacement vectors by using dynamic programming.

The computing device described above where the image stitching component is arranged to calculate a first plurality of the displacement vectors on the basis of a measure of local similarity between the first and second images.

The computing device described above where the image stitching component is arranged to calculate the first plurality of displacement vectors by searching over possible displacement vectors for each of the first plurality of displacement vectors simultaneously.

The computing device described above where the image stitching component is arranged to calculate a first plurality of the displacement vectors for some but not all of the warp points.

The computing device described above where the image stitching component is arranged to calculate a second plurality of the displacement vectors by interpolation from the first plurality of the displacement vectors.

The computing device described above where the image stitching component computes a similarity cost map comprising a two dimensional array where columns represent possible displacement vectors and rows represent individual warp points, and where a value in a cell of the array is a measure of local similarity between the first and second images for the warp point and displacement vector specified by the cell location in the array.

The computing device described above where the image stitching component computes a least similarity cost path through the similarity cost map and assigns displacement vectors on the least similarity cost path to the associated warp points.

The computing device described above where the image stitching component computes the least similarity cost path by taking into account image content of the second image.

The computing device described above where the image stitching component comprises a parallel computing unit and where individual rows of the array are computed using individual execution threads of the parallel computing unit.

The computing device described above where the image stitching component takes into account the image content of the second image by including interaction potentials in an accumulated similarity cost function.

The computing device described above where the image stitching component is arranged to compute a seam between the warped second image and the first image by computing a path in the region of overlap, where the path follows a route with least difference in color between the first image and the warped second image.

The computing device described above where the computing device is a digital camera.

The computing device described above where the image stitching component is at least partially implemented using hardware logic selected from any one or more of: a field-programmable gate array, an application-specific integrated circuit, an application-specific standard product, a system-on-a-chip, a complex programmable logic device, a graphics processing unit.

A method of forming a panoramic image comprising:
receiving at least two input images depicting different parts of a panoramic scene, the images having been captured by a user moving the camera to capture the panorama;
identifying, at a processor, a region of overlap between the at least two images; calculating a displacement vector for each of a plurality of warp points in the region of overlap; warping a second one of the at least two images using the warp points; and joining the warped second image to the first image.

The method described above comprising calculating the displacement vectors in a single dimension.

A computing device comprising:
a memory holding at least two input images depicting different parts of a panoramic scene, the images having been captured by a user moving the camera to capture the panorama; and
an image stitching component that identifies, at a processor, a region of overlap between the at least two images;
the image stitching component calculating a displacement vector for each of a plurality of warp points in the region of overlap, where the displacement vectors are constrained to be in a single direction;
the image stitching component warping a second one of the at least two images using the warp points, and joining the warped second image to the first image.

The examples illustrated and described herein as well as examples not specifically described herein but within the scope of aspects of the disclosure constitute exemplary means for stitching images together to form a panoramic image. For example, the memory of FIG. 1, FIG. 8. and FIG. 9, constitutes exemplary means for holding at least two input images depicting different parts of a panoramic scene, the images having been captured by a user moving the camera by hand to capture the panorama. The processor of FIG. 1, FIG. 8. and FIG. 9 constitutes exemplary means for identifying, a region of overlap between the at least two images. The image stitching component of FIG. 1, FIG. 8. and FIG. 9 constitutes exemplary means for calculating a displacement vector for each of a plurality of warp points of a warp grid in the region of overlap in a direction of an axis of the region of overlap. The image stitching component of FIG. 1, FIG. 8. and FIG. 9 constitutes exemplary means for warping a second one of the at least two images using the warp grid. The image stitching component of FIG. 1, FIG. 8. and FIG. 9 constitutes exemplary means for joining the warped second image to the first image.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing device comprising:
a memory holding at least two input images depicting different parts of a panoramic scene, the images having been captured by a user moving the camera to capture the panorama;
an image stitching component configured to identify, at a processor, a region of overlap between the at least two images;
the image stitching component configured to position a plurality of warp points for first and second images of the at least two images in the region of overlap and constrain displacement between the plurality of warp points for the first and second images using a least similarly cost path for the plurality of warp points through the region of overlap; and
the image stitching component configured to warp the second one of the at least two images based at least upon a determined local similarity between the first and second images at the plurality of warp points and the constrained displacement, and to join the warped second image to the first image.

2. The computing device of claim 1, wherein the image stitching component is configured to position the plurality of warp points on a warp line in the region of overlap, the plurality of warp points selected from a warp field, the warp field being a tessellation of points.

3. The computing device of claim 1, wherein the image stitching component is configured to calculate a displacement vector for each warp point of the plurality of the warp points in the region of overlap by comparing the first and second images at the plurality of warp points.

4. The computing device of claim 3, wherein the image stitching component computes a similarity cost map for the warp points for the first and second images of the at least two images, and where a value in a cell of the similarity cost map is a measure of local similarity between the first and second images for the warp point and the displacement vector specified by a cell location in the array.

5. The computing device of claim 4, wherein the image stitching component is configured to compute the least similarity cost path through the similarity cost map and assigns displacement vectors on the least similarity cost path to the associated warp points.

6. The computing device of claim 5, wherein the image stitching component is configured to compute the least similarity cost path by taking into account image content of the second image, the image stitching component taking into account the image content of the second image by including interaction potentials in an accumulated similarity cost function.

7. The computing device of claim 4, wherein the similarity cost map comprises an array and the image stitching component comprises a parallel computing unit, and where individual rows of the array are computed using individual execution threads of the parallel computing unit.

8. The computing device of claim 3, wherein the image stitching component is configured to calculate the displacement vectors by constraining a difference in displacement vectors between adjacent ones of the warp points.

9. The computing device of claim 8, wherein the image stitching component is configured to constrain the difference in displacement vectors using dynamic programming.

10. The computing device of claim 3, wherein the image stitching component is configured to calculate individual ones of the displacement vectors in a single dimension, the single dimension being a direction parallel to an intensity gradient in a neighborhood around one or more of the warp points.

11. The computing device of claim 3, wherein the image stitching component is configured to calculate a first plurality of the displacement vectors on the basis of a measure of local similarity between the first and second images.

12. The computing device of claim 11, wherein the image stitching component is configured to calculate the first plurality of displacement vectors by searching over possible displacement vectors for each of the first plurality of displacement vectors simultaneously.

13. The computing device of claim 3, wherein the image stitching component is configured to calculate a first plurality of the displacement vectors for some but not all of the warp points, and calculate a second plurality of the displacement vectors by interpolation from the first plurality of the displacement vectors.

14. The computing device of claim 1, wherein the image stitching component is configured to compute a seam between the warped second image and the first image by computing a path in the region of overlap, where the path follows a route with least difference in color between the first image and the warped second image.

15. The computing device of claim 1, wherein the image stitching component is configured to warp the second image only in the region of overlap.

16. The computing device of claim 1, wherein the computing device is a digital camera.

17. A method of forming a panoramic image comprising:

receiving at least two input images depicting different parts of a panoramic scene, the images having been captured by a user moving the camera to capture the panorama;

identifying, by a processor, a region of overlap between the at least two images;

positioning a plurality of warp points for first and second images of the at least two images in the region of overlap and constraining displacement between the plurality of warp points for the first and second images using a least similarly cost path for the plurality of warp points through the region of overlap;

warping the second one of the at least two images based at least upon a determined local similarity between the first and second images at the plurality of warp points and the constrained displacement; and joining the warped second image to the first image.

18. The method of claim 17, further comprising:

calculating a displacement vector for each warp point of the plurality of warp points in the region of overlap by computing a similarity cost map for possible displacement vectors and individual warp points of the plurality of warp points for first and second images of the at least two images.

19. One or more computer storage media having computer-executable instructions for forming a panoramic image that, upon execution by a processor, cause the processor to at least:

receive at least two input images depicting different parts of a panoramic scene, the images having been captured by a user moving the camera to capture the panorama;

identify, by a processor, a region of overlap between the at least two images;

position a plurality of warp points for first and second images of the at least two images in the region of overlap and constrain displacement between the plurality of warp points for the first and second images using a least similarly cost path for the plurality of warp points through the region of overlap;

warp the second one of the at least two images based at least upon a determined local similarity between the first and second images at the plurality of warp points and the constrained displacement; and join the warped second image to the first image.

20. The one or more computer storage media of claim 19 having further computer-executable instructions that, upon execution by a processor, cause the processor to at least:

calculate a displacement vector for each warp point of the plurality of warp points in the region of overlap by computing a similarity cost map for possible displacement vectors and individual warp points of the plurality of warp points for first and second images of the at least two images.

* * * * *